(12) United States Patent
Argue et al.

(10) Patent No.: US 9,818,091 B2
(45) Date of Patent: Nov. 14, 2017

(54) BARCODE TRANSFERRING RECEIPT DATA TO A COMPUTING DEVICE OF A CUSTOMER

(75) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 855 days.

(21) Appl. No.: 13/560,743

(22) Filed: Jul. 27, 2012

(65) Prior Publication Data

US 2014/0032347 A1 Jan. 30, 2014

(51) Int. Cl.
  G06Q 40/00 (2012.01)
  G06Q 20/04 (2012.01)
  G06Q 20/32 (2012.01)
  G06Q 20/20 (2012.01)

(52) U.S. Cl.
  CPC ....... *G06Q 20/0453* (2013.01); *G06Q 20/209* (2013.01); *G06Q 20/3276* (2013.01)

(58) Field of Classification Search
  None
  See application file for complete search history.

(56) References Cited

U.S. PATENT DOCUMENTS

| | | | |
|---|---|---|---|
| 7,917,171 | B2 | 3/2011 | Silverbrook |
| 8,045,236 | B2 | 10/2011 | Karmakar et al. |
| 2002/0181710 | A1 | 12/2002 | Adam |
| 2007/0066351 | A1* | 3/2007 | Silverbrook ........... G06Q 20/14 455/557 |
| 2007/0069013 | A1 | 3/2007 | Seifert et al. |
| 2007/0089168 | A1 | 4/2007 | Wang |
| 2007/0235525 | A1 | 10/2007 | Murch |
| 2008/0208762 | A1 | 8/2008 | Arthur |

(Continued)

FOREIGN PATENT DOCUMENTS

EP 2575097 A1 4/2013

OTHER PUBLICATIONS

Final Office Action (U.S. Appl. No. 13/560,674); Notification Date: Mar. 18, 2016.

(Continued)

*Primary Examiner* — Shay S Glass
*Assistant Examiner* — Russell S Glass
(74) *Attorney, Agent, or Firm* — Bryan Cave LLP (57) ABSTRACT

A method is disclosed for transferring receipt data to a computing device corresponding to a customer. The method may include initiating a transaction at a point-of-sale system. During the transaction, a computer system comprising the point-of-sale system, may collect receipt data documenting the transaction. The computer system may generate a barcode unique to the transaction and comprising encoded data. Once the transaction has been completed, the computer system may present the barcode to the customer. This may be done via a printed receipt, a customer-facing display, or the like. Using the encoded data, the computer system may deliver the receipt data to a computing device in the possession of the customer. For example, the encoded data may comprise the receipt data. Alternatively, the encoded data may comprise a URL directing the computing device to a resource system from which the receipt data may be downloaded.

10 Claims, 9 Drawing Sheets

(56) References Cited

U.S. PATENT DOCUMENTS

| | | |
|---|---|---|
| 2009/0177581 A1 | 7/2009 | Garcia |
| 2009/0281904 A1 | 11/2009 | Pharris |
| 2009/0292591 A1 | 11/2009 | Schultz et al. |
| 2010/0131415 A1 | 5/2010 | Sartipi |
| 2010/0320266 A1 | 12/2010 | White |
| 2011/0042456 A1 | 2/2011 | Masaryk |
| 2011/0121069 A1* | 5/2011 | Lindahl .............. G06Q 30/0207 235/375 |
| 2011/0161791 A1 | 6/2011 | Travis et al. |
| 2011/0225057 A1 | 9/2011 | Webb |
| 2011/0264586 A1* | 10/2011 | Boone .................... G06Q 20/20 705/67 |
| 2012/0210415 A1 | 8/2012 | Somani et al. |
| 2012/0221446 A1 | 8/2012 | Grigg et al. |
| 2012/0259715 A1 | 10/2012 | Robson et al. |
| 2012/0284101 A1 | 11/2012 | Schiller et al. |
| 2012/0290609 A1 | 11/2012 | Britt |
| 2012/0323664 A1 | 12/2012 | Klems |
| 2012/0323768 A1 | 12/2012 | Weinstein et al. |
| 2013/0073365 A1 | 3/2013 | McCarthy |
| 2013/0173403 A1 | 7/2013 | Grigg |
| 2013/0222598 A1 | 8/2013 | Tomar et al. |

OTHER PUBLICATIONS

Office Action (U.S. Appl. No. 13/560,707); Notification Date: Mar. 1, 2016.
Final Office Action (U.S. Appl. No. 13/560,707); Notification Date: Jul. 5, 2016.
Non-Final Office Action (U.S. Appl. No. 13/560,707); Notification Date: Dec. 2, 2016.

* cited by examiner

BARCODE TRANSFERRING RECEIPT DATA TO A COMPUTING DEVICE OF A CUSTOMER

RELATED APPLICATIONS

This application is related to U.S. application Ser. No. 13/560,674, filed Jul. 27, 2012 and U.S. application Ser. No. 13/560,707, filed Jul. 27, 2012. The application is incorporated herein by reference for all purposes.

BACKGROUND

Field of the Invention

This invention relates to point-of-sale systems and more particularly to systems and methods for passing electronic receipt data from a point-of-sale system to a computing device of a customer.

Background of the Invention

Many point-of-sale (POS) systems currently in use today do not support important emerging technologies, services, and marketing opportunities. For example, many POS systems are limited in their ability to quickly and securely deliver electronic receipt data to a computing device of a customer. As a result, those POS systems cannot effectively implement many novel methods and services surrounding such data. Accordingly, what is needed is an apparatus and method expanding the ability of a wide variety of POS systems, include legacy POS systems, to pass electronic receipt data from a point-of-sale system to a computing device of a customer.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods. Accordingly, the invention has been developed to provide apparatus and methods for passing electronic receipt data from a point-of-sale system to a computing device of a customer. For example, in selected embodiments, a customer may enter a "brick-and-mortar" business location and approach a POS system to begin a transaction. As part of the transaction, the customer may be identified. Identification information may enable a computer system in accordance with the present invention to identify and communicate with a computing device corresponding to the customer.

During and/or after the transaction, receipt data may be collected and a push notification may be sent to the computing device. In selected embodiments, a push notification may include an alert message to display to the customer (e.g., "You have a new electronic receipt.") and a notification sound or vibration to play or execute. If the customer is carrying the computing device on his or her person within the brick-and-mortar location, the customer may be quickly alerted (e.g., by sound, vibration, or the like) that receipt data is ready for download. For example, the customer may be alerted within the time it would typically require to print a paper receipt.

In viewing an alert generated on the computing device by the push notification, the customer may choose to close the alert or launch a corresponding application. If the customer launches the application, the application may automatically synchronize or download any new receipt data.

In selected alternative embodiments, a push notification may carry significantly more data than simply an alert message. For example, the push notification may carry certain receipt data to the computing device. In still other alternative embodiments or methods, a computer system in accordance with the present invention may deliver receipt data to the computing device without specifically identifying a corresponding customer.

For example, a POS system may present an advertisement containing a machine-readable code to a customer. The machine-readable code may be encoded with receipt data. Accordingly, should the customer respond to a call to action and wish to import receipt data, he or she may launch an appropriate application on his or her computing device and scan the machine-readable code. By decoding the machine-readable code, the application may obtain and import the corresponding receipt data.

Alternatively, a machine-readable code may be encoded with a URL including one or more identifications (e.g., information identifying the transaction). Accordingly, after an appropriate application is launched and a machine-readable code is scanned by the computing device of the customer, an appropriate resource within a computer system may be accessed and receipt data corresponding to the transaction may be returned to (e.g., downloaded by) the computing device.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer of a point-of-sale (POS) system, partly on a POS computer, as a stand-alone software package, on a stand-alone hardware unit, partly on a remote computer spaced some distance from the POS computer, or entirely on a remote computer or server. In the latter scenario, the remote computer may be connected to the POS computer through any type of network, including a local area network (LAN) or a wide area network (WAN), or the connection may be made to an external computer (e.g., through the Internet using an Internet Service Provider).

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
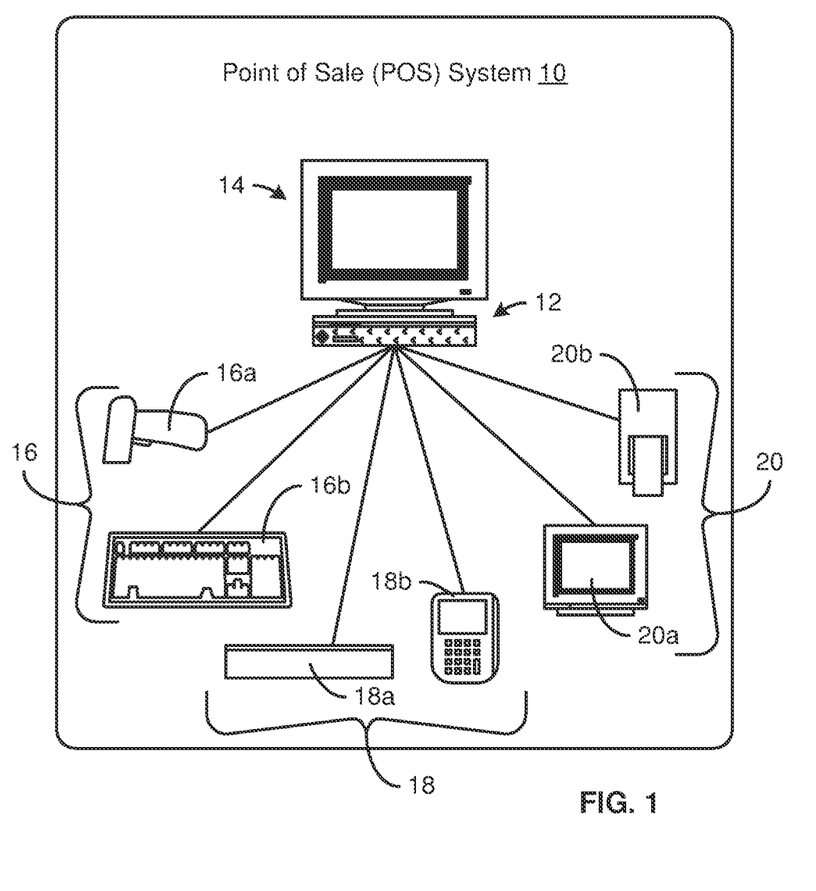
FIG. 1 is a schematic block diagram of one embodiment of a point-of-sale (POS) system for implement methods in accordance with the present invention.

Referring to FIG. 1, in selected embodiments, the hardware, software, or hardware and software of a POS system 10 may be configured to implement one or more methods in accordance with the present invention. For example, a POS system 10 may be manufactured, programmed, modified, or upgraded to support passing of receipt data to a computing device of a customer.

A POS system 10 in accordance with the present invention may include various components. In certain embodiments, a POS system 10 may include a central or primary computer 12, a monitor 14 (e.g., a cashier-facing monitor 14), one or more input devices 16 (e.g., scanners 16a, keyboards 16b, scales, or the like), one or more payment devices 18 (e.g., cash drawers 18a, card readers 18b) for receiving or returning payments, one or more output devices 20 (e.g., customer-facing display 20a or monitor 20a, receipt printer 20b), or the like or combinations or sub-combinations thereof.

A computer 12 may form the primary processing unit of a POS system 10. Other components 16, 18, 20 forming part of a POS system 10 may communicate with the computer 12. Input devices 16 and certain payment devices 18 may feed data and commands to a computer 12 for processing or implementation. For example, a scanner 16a may pass data communicating the identity of one or more items to be purchased, returned, or the like to a computer 12. Similarly, a card reader 18b may pass payment information to a computer 12.

Conversely, output devices 20 and certain payment devices 18 may follow or implement commands issued by a computer 12. For example, a cash drawer 18a may open in accordance with the commands of a computer 12. Similarly, a customer-facing display 20*a* and receipt printer 20*b* may display or output data or information as instructed by a computer 12.

In selected embodiments, in addition to handling consumer transactions (e.g., purchases, returns), a POS system 10 may also provide or support certain "back office" functionality. For example, a POS system 10 may provide or support inventory control, purchasing, receiving and transferring products, or the like. A POS system 10 may also store sales and customer information for reporting purposes, marketing purposes, receivables management, trend analysis, cost analysis, price analysis, profit analysis, or the like. If desired or necessary, a POS system 10 in accordance with the present invention may include an accounting interface to pass certain information to one or more in-house or independent accounting applications.

Figure 2:
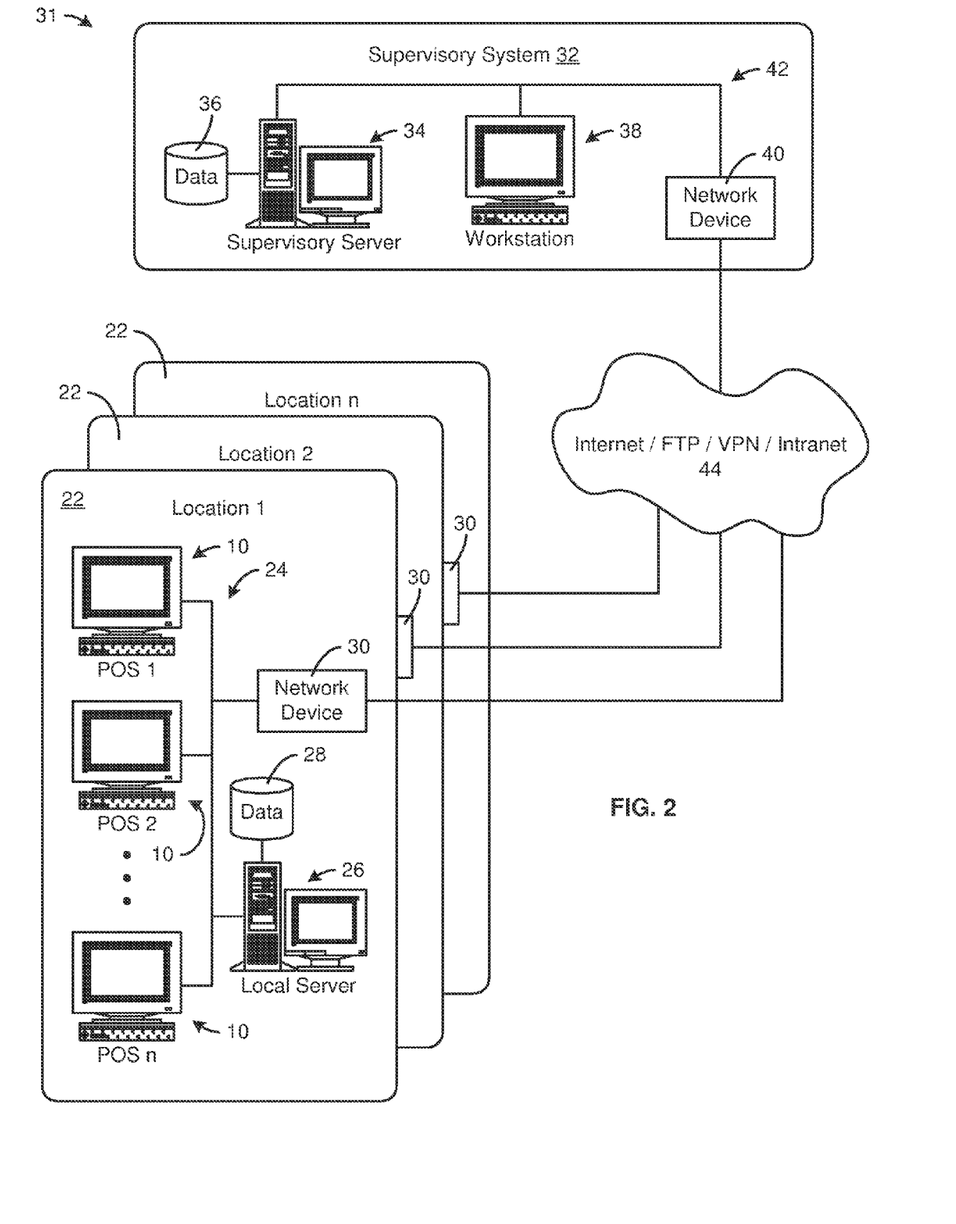
FIG. 2 is a schematic block diagram of one embodiment of multiple POS systems in accordance with the present invention operating in the context of an enterprise-wide system.

Referring to FIG. 2, in selected embodiments, a POS system 10 may operate substantially independently, as a stand-alone unit. Alternately, a POS system 10 in accordance with the present invention may be one of several POS systems 10 forming the front line of a larger system. For example, multiple POS systems 10 may operate at a particular location 22 (e.g., within a retail, brick-and-mortar store). In such embodiments, the various POS systems 10 may be interconnected via a LAN 24. A LAN 24 may also connect the POS systems 10 to a local server 26.

A local server 26 may support the operation of the associated POS systems 10. For example, a server 26 may provide a central repository from which certain data needed by the associated POS systems 10 may be stored, indexed, accessed, or the like. A server 26 may serve certain software to one or more POS systems 10. In certain embodiments, a POS system 10 may offload certain tasks, computations, verifications, or the like to a server 26.

Alternatively, or in addition thereto, a server 26 may support certain back office functionality. For example, a server 26 may receive and compile (e.g., within one or more associated databases 28) data from the various associated POS systems 10 to provide or support inventory control, purchasing, receiving and transferring products, or the like. A server 26 may also receive and compile sales and customer information for reporting purposes, marketing purposes, receivables management, trend analysis, cost analysis, price analysis, profit analysis, or the like.

In certain embodiments, one or more POS systems 10 or servers 26 corresponding to a particular location 22 may communicate with or access one or more remote computers or resources via one or more network devices 30. For example, a network device 30 may enable a POS system 10 to contact outside resources and verify the payment credentials (e.g., credit card information) provided by a customer. A network device 30 may comprise a modem, router, or the like.

In selected embodiments, a POS system 10 in accordance with the present invention may operate within an enterprise-wide system 31 comprising multiple locations 22 (e.g., branches 22 or stores 22). In such embodiments, each location 22 may have one or more POS systems 10, local servers 26, local databases 28, network devices 30, or the like or combinations or sub-combinations thereof connected by a computer network (e.g., a LAN 24). Additionally, each such location 22 may be configured to interact with one or more supervisory systems 32. For example, multiple branch locations 22 may report to an associated "headquarters" location or system.

A supervisory system 32 may comprise one or more supervisory servers 34, databases 36, workstations 38, network devices 40, or the like or combinations or sub-combinations thereof. The various components of a supervisory system 32 may be interconnected via a computer network (e.g., a LAN 42). In selected embodiments, a supervisory system 32 may comprise one or more supervisory servers 34 providing a central repository from which certain data needed by the one or more POS systems 10 or local servers 26 may be stored, indexed, accessed, or the like.

Alternatively, or in addition thereto, a supervisory server 34 may receive and compile (e.g., within one or more associated databases 36) data from the various associated POS systems 10 or local servers 26 to provide or support inventory control, purchasing, receiving and transferring products, or the like. A supervisory server 34 may also receive and compile sales and customer information for reporting purposes, marketing purposes, receivables management, trend analysis, cost analysis, price analysis, profit analysis, or the like.

A supervisory system 32 may be connected to one or more associated locations 22 or branches 22 in via any suitable computer network 44 (e.g., WAN 44). For example, in selected embodiments, one or more locations 22 may connect to a supervisor system 32 via the Internet. Communication over such a network 44 may follow any suitable protocol or security scheme. For example, communication may utilize the File Transfer Protocol (FTP), a virtual private network (VPN), intranet, or the like.

Figure 3:
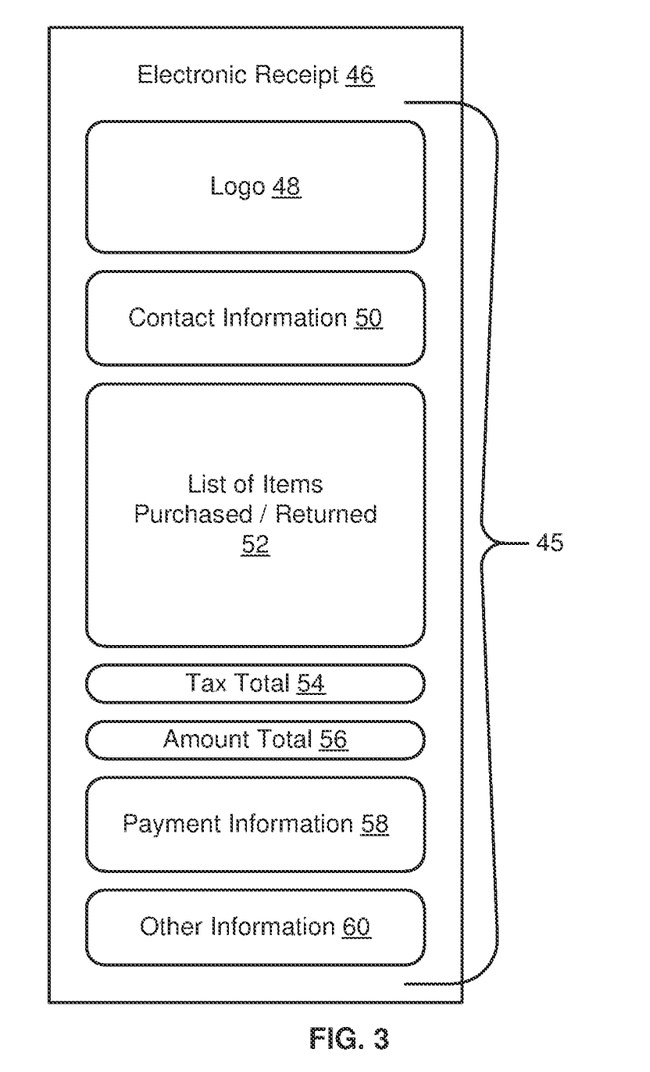
FIG. 3 is a schematic block diagram of one embodiment of receipt in accordance with the present invention.

Referring to FIG. 3, a POS system 10 may collect and/or generate receipt data 45. Receipt data 45 may document a transaction (e.g., sale or return) carried out by a POS system 10. Receipt data 45 may be presented or displayed to a customer in the form of an electronic (e.g., paperless) receipt 46. In selected embodiments, receipt data 45 may be delivered to a customer's computing device (e.g., a mobile telephone, personal digital assistant (PDA), media player, tablet computer or reader, laptop computer, desktop computer, or the like, hereinafter a "computing device") by an entity's computer system (e.g., a system comprising one or more POS systems 10, local servers 26, supervisory servers 34, some other onsite resources, some other offsite resources, or the like or combinations or sub-combinations thereof, hereinafter a "computer system").

In selected embodiments, receipt data 45 and an electronic receipt 46 may include a logo 48, contact information 50, a list 52 of items purchased or returned, a total 54 indicating the sales tax assessed or returned, a total 56 indicating the amount paid or returned, payment information 58, other information 60, or the like or combinations or sub-combinations thereof.

A logo 48 may reinforce the brand and image of the associated entity within the mind of a consumer. By including contact information 50 on an electronic receipt 46, an entity may ensure that a customer has ready access to one or more physical addresses, Internet address, telephone numbers, facsimile numbers, hours of operation, or the like or combinations or sub-combinations thereof. One or more of a list 52 of items purchased or returned, a total 54 indicating the sales tax assessed or returned, a total 56 indicating 56 the amount paid or returned, and payment information 58 (e.g., date of transaction, an indication of method of payment, an indication of which credit or debit card was used, etc.) may be included to document important details of a transaction.

Other information 60 may be included within an electronic receipt 46 as desired or necessary. For example, to promote brand loyalty, an entity may include an indication of an amount saved in the transaction, a yearly total of the amount saved, reward points earned, or the like. Alternatively, or in addition thereto, other information 60 may include promotional information, a solicitation to participate in a survey, an employment opportunity, contest information, or the like.

An electronic receipt 46 may be presented by a computing device of a customer in any suitable layout or format. For example, the receipt data 45 forming an electronic receipt 46 may simply be presented as a textual list. Alternatively, an electronic receipt 46 may follow the form of a paper receipt. That is, the electronic receipt 46 may comprise a virtual representation or layout substantially matching what a comparable paper receipt would look like.

The manner in which an electronic receipt 46 is presented or displayed on a computing device of a customer may be completely dictated by the computer system delivering the receipt data 45 thereto. Alternatively, the computing device of the customer may have an application (e.g., a receipt manager, accounting program, budgeting program, or the like) installed thereon. Such an application may partially or completely control the layout or format of an electronic receipt 46 displayed therewith or therethrough. For example, a computer system may supply receipt data 45, while the application installed on the computing device of the customer supplies the layout or formatting.

Figure 4:
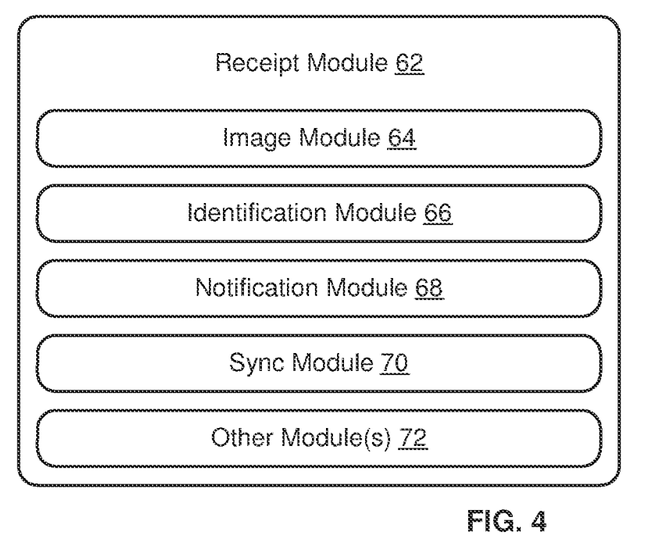
FIG. 4 is a schematic block diagram of one embodiment of a receipt module in accordance with the present invention.

Referring to FIG. 4, a computer system in accordance with the present invention may deliver receipt data 45 to a computing device of a customer in any suitable manner. In selected embodiments, a receipt module 62 may enable or support such delivery. A receipt module 62 may include any suitable arrangement of sub-components or modules. In certain embodiments, a receipt module 62 may include an image module 64, identification module 66, notification module 68, synchronization module 70, one or more other modules 72 as desired or necessary, or the like or some combination or sub-combination thereof.

An image module 64 may assemble, generate, or obtain an advertisement. In general, consumers rely heavily on visual cues. Accordingly, an advertisement may include a significant graphical component. That is, an advertisement in accordance with the present invention may impact a consumer through images, stylization, or the like, rather than just through plain text. Thus, in certain embodiments, some portion or all of an advertisement may be passed within a computer system as an image and printed or displayed as an image, not as text. For example, an advertisement (or a significant portion thereof) may be passed to a receipt printer 20b or customer-facing display 20a in a stream including a raster-coded image or bitmap.

In selected embodiments, an image module 64 may be tasked with obtaining or generating one or more images associated with an advertisement. For example, an image module 64 may obtain, generate, and/or assemble one or more advertisements and deliver the one or more advertisements to a receipt printer 20b, customer-facing display 20b, or the like or some combination thereof. An image module 64 may include any suitable arrangement of sub-components or modules.

In certain embodiments, an image module 64 may assemble, generate, or obtain an advertisement comprising a call to action. A call to action may invite or motivate a customer to take a particular step or action. For example, a call to action may invite or motive a consumer to download receipt data 45. To increase the likelihood that a consumer will respond favorably to the call to action, an advertisement may include an enabler facilitating the desired step or action. For example, in selected embodiments, an advertisement may include a machine-readable code. By scanning the code (e.g., scanning the code using a camera on a mobile telephone, tablet computer, or the like), a consumer may import receipt data 45 encoded within the code. Alternatively, scanning the code may initiate the download of receipt data 45.

In selected embodiments, a machine-readable code may comprise a barcode. For example, in certain embodiments, a machine-readable code may comprise a two-dimensional barcode. Two-dimensional barcodes may support or provide more data per unit area than can be obtained using a traditional one-dimensional barcode. Moreover, two-dimensional barcodes are typically configured to be scanned using a camera, an item that is commonly found on personal electronic devices. A two-dimensional barcode for use in accordance with the present invention may follow any suitable protocol, format, or system. In selected embodiments, a two-dimensional code may be embodied as a Quick Response (QR) Code.

An identification module 66 may be tasked with requesting, collecting, and/or communicating identification information linking a customer associated with a transaction with one or more records stored within a computer system. For example, as part of a transaction carried out at a POS system 10, an identification module 66 may request, collect, and/or communicate identification information linking a transaction to a particular computing device corresponding to the customer participating in the transaction. Thus, information corresponding to the transaction may be passed to the customer via the particular computing device.

An identification module 66 may request, collect, and/or communicate one or more types of identification information. For example, in selected embodiments, an identification module 66 may collect a unique identification or membership number from a customer. This may be done when a membership card, club card, loyalty card, identification card, credit card, debit card, fingerprint or other biometric characteristic, or the like is scanned, input, or otherwise collected at a POS system 10. In other situations, a cashier or customer may type in a unique identification number, payment number, membership number, or the like at a POS system 10. For example, while a cashier is processing a transaction, a customer may be prompted via a card reader 18b, customer-facing display 20, or the like to enter (e.g., type in using the card reader 18b) a mobile telephone number corresponding to the customer. Alternatively, a cashier may type in a telephone number corresponding to the customer.

Once the identification information is received, it may be used directly (e.g., used directly to pass receipt data 45 to a computing device of a corresponding customer). Alternatively, the identification information may be linked to one or more previously stored computer records. Within such records, a computer system may find the information necessary to identify and communicate with a computing device of a corresponding customer.

A notification module 68 may assemble, generate, obtain, direct, and/or issue one or more push notifications. In selected embodiments, push notifications may be directed to a computing device of a customer. For example, when an appropriate application in not running on a computing device, push notifications may inform the customer that certain data or options are available (e.g., that a new electronic receipt 46 is available for download).

A synchronization module 70 may support or enable one way or two way data communication between a computer system and a computing device. For example, a synchronization module 70 may support or enable the passing of receipt data 45 from a computer system to a computing device. A synchronization module 70 may also enable certain data received from a computing device to be incorporated within or used by a computer system. For example, one or more user preferences (e.g., notification preferences) may be communicated to a computer system from an application resident on a computing device.

The various functions or modules of a receipt module 62 may be enacted or implemented by any suitable system or component thereof. For example, in selected embodiments, one or more functions or modules of a receipt module 62 may be distributed across one or more hardware devices, including a primary computer 12 of a POS system 10, a local server 26, a supervisory server 34, some other onsite resource, some other offsite resource, or the like or combinations or sub-combinations thereof. Thus, systems and methods in accordance with the present invention may be adapted to a wide variety of situations, including more rigid legacy systems.

Figure 5:
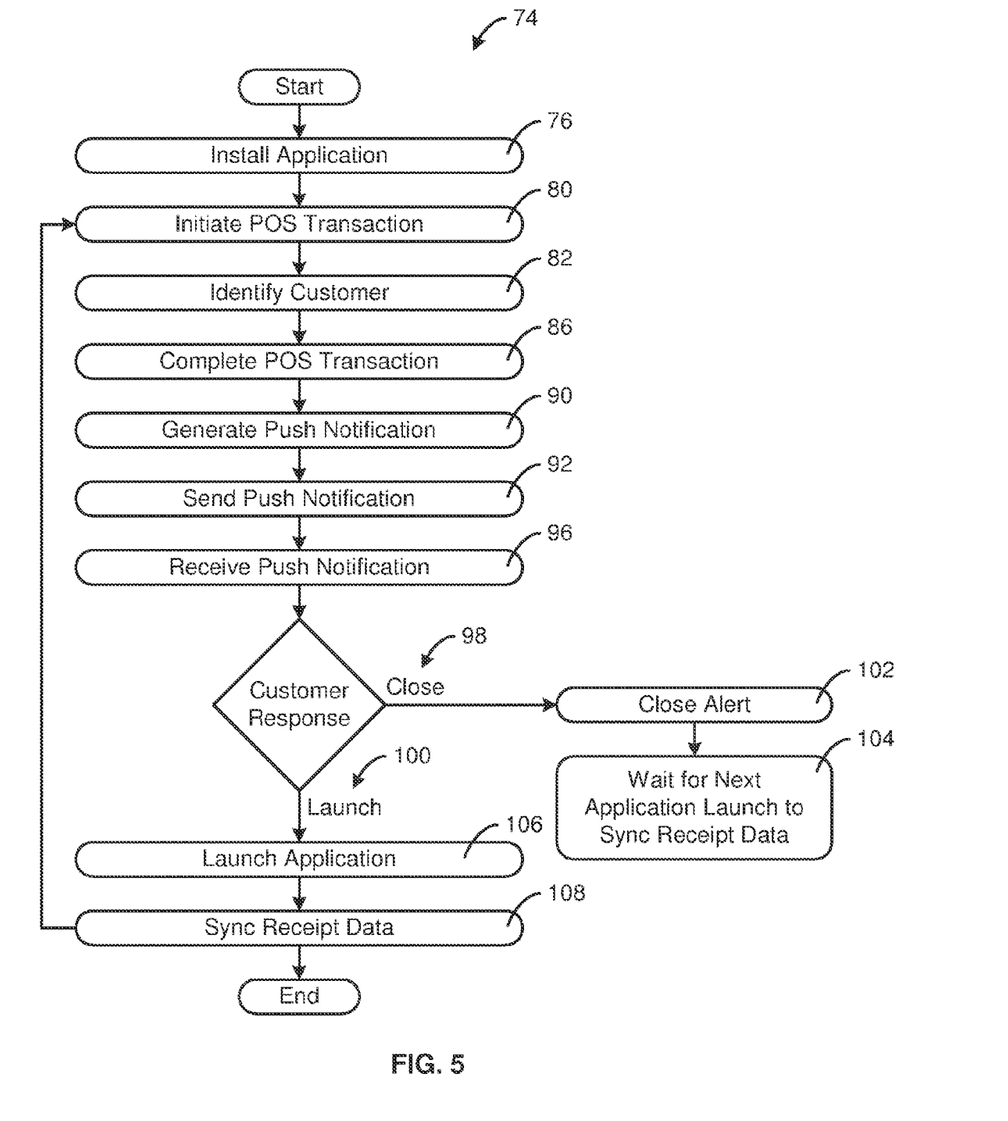
FIG. 5 is a block diagram of one embodiment of a method for passing electronic receipt data from a point-of-sale system to a computing device of a customer.
Figure 6:
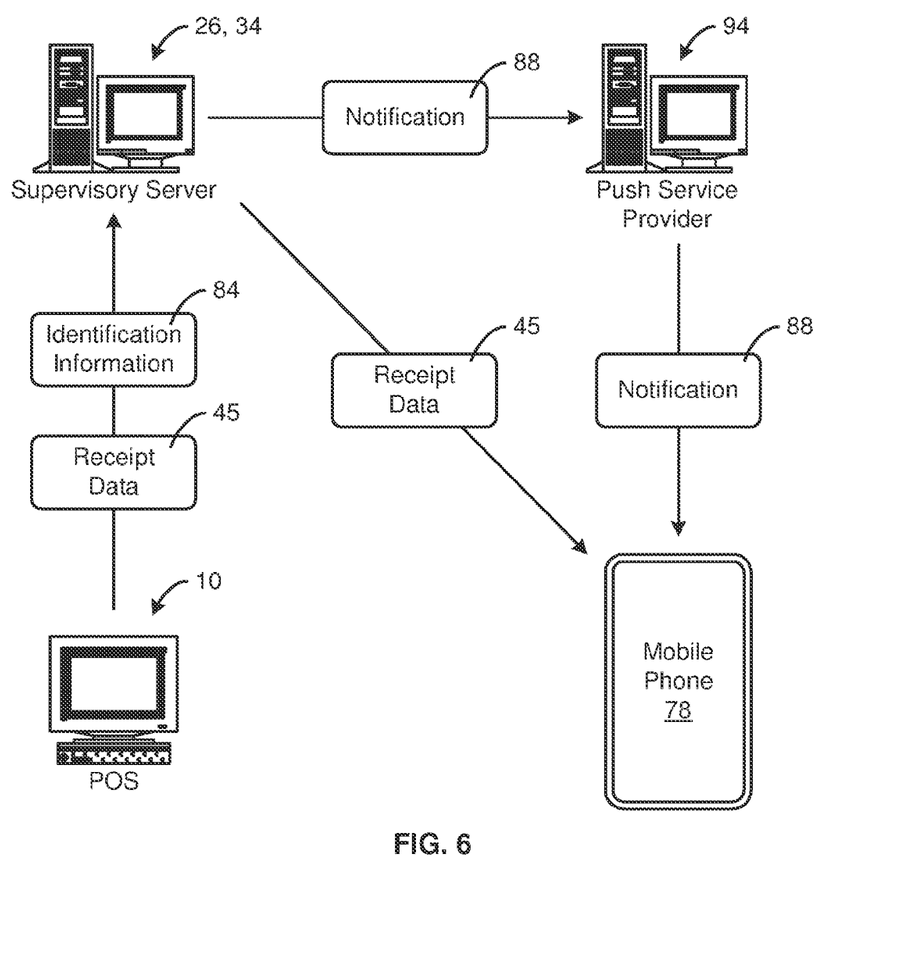
FIG. 6 is a block diagram illustrating the flow of certain data within one embodiment of a system in accordance with the present invention.

Referring to FIGS. 5 and 6, one method 74 in accordance with the present invention may begin when an application programmed to receive, format, display, categorize, and/or analyze receipt data 45 is installed 76 on a computing device 78 (e.g., a mobile telephone 78 of a customer). A customer may then enter a "brick-and-mortar" business location (e.g., a brick-and-mortar retail store) and approach a POS system 10. At the POS system 10, a transaction (e.g., a purchase, return, or the like) may be initiated 80.

As part of a transaction, a customer may be identified 82. For example, a POS system 10 may scan a membership card, club card, loyalty card, identification card, credit card, debit card, or the like. From the scan, identification information 84 (e.g., a unique identification, card, or membership number) may be obtained. Alternatively, while a cashier is processing a transaction, a customer may be prompted via a card reader 18b, customer-facing display 20, or the like to enter (e.g., type in using the card reader 18b) an identification number (e.g., a mobile telephone number).

Identification information 84 may be passed from a POS system 10 to one or more other computers (e.g., servers 26, 34) within a computer system. The identification information 84 may link a customer and a corresponding transaction to one or more records stored within a computer system. In selected embodiments, such records may contain the information necessary to identify and communicate with a computing device 78 of the corresponding customer.

Once a transaction has been completed 86, receipt data 45 may be passed from a POS system 10 to one or more other computers (e.g., servers 26, 34) within a computer system. A push notification 88 may then be generated 90 and sent 92 to an appropriate computing device 78. In selected embodiments, a push notification 88 may be short message comprising a device token and a payload. A device token may contain information that enables a push service provider 94 (e.g., Apple Push Notification Service, Android Cloud to Device Messaging (C2DM), or the like) to locate the appropriate computing device 78 on which the application is installed 76. A device token may also permit a push service provide 94 to authenticate the routing of a push notification 88.

A payload of a push notification 88 may comprise various data. In general, the nature and extent of the payload may be controlled by the specifications and features imposed or provided by a push service provider 94. Some providers 94 may support significantly more data and/or functionality in association with push notifications 88. In selected embodiments, a payload may comprise a property list specifying how a customer associated with the computing device 78 is to be alerted. For example, a payload may specify an alert message to display to the customer (e.g., "You have a new electronic receipt"), a number with which to badge the application icon, a notification sound or vibration to play or execute, or the like.

A computer system in accordance with the present invention may send 92 a push notification 88 as soon as possible after the completion 86 of the transaction. Typically, a push notification 88 may be sent 92 substantially immediately upon completion 86 (e.g., within one second or less of completion 86). Accordingly, a push notification 88 may typically be received 96 by a computing device 78 very shortly after completion 86 (e.g., within four seconds and preferably within about two seconds of completion 86). Accordingly, if a customer is carrying the corresponding computing device 78 on his or her person within the brick-and-mortar location, the customer may be alerted (e.g., by sound, vibration, or the like) that the receipt data 45 is ready for download within the time it would typically require to print a paper receipt.

Once a push notification 88 is received 96 by a computing device 78, a customer may choose how he or she would like to respond. For example, in viewing an alert generated on a computing device 78 by a push notification 88, a customer may be presented with the options of closing 98 the alert and launching 100 the corresponding application. Should the customer elect to close 98 the alert, the alert may be closed 102 and the computing device 78 may wait 104 until the next launch (e.g., a launch 100 in response to an alert associated with a later transaction) to synchronize or download receipt data 45.

If the customer elects to launch 100 the application, then the application may be launched 106 on the computing device 78. In selected embodiments, the launching 106 of the application may automatically trigger synchronization 108 or download 108 of any new receipt data 45. This process 74 or certain portions thereof may be repeated with one or more subsequent transactions. Accordingly, an application resident on a computing device 78 may collect a data set useful for budgeting, electronic search of transaction data, couponing, shopping lists, electronic backup of transaction data, sharing of transaction data with family, friends, and/or co-workers, tracking of expenses for business or tax purposes, or the like or combinations or sub-combinations thereof.

Figure 7:
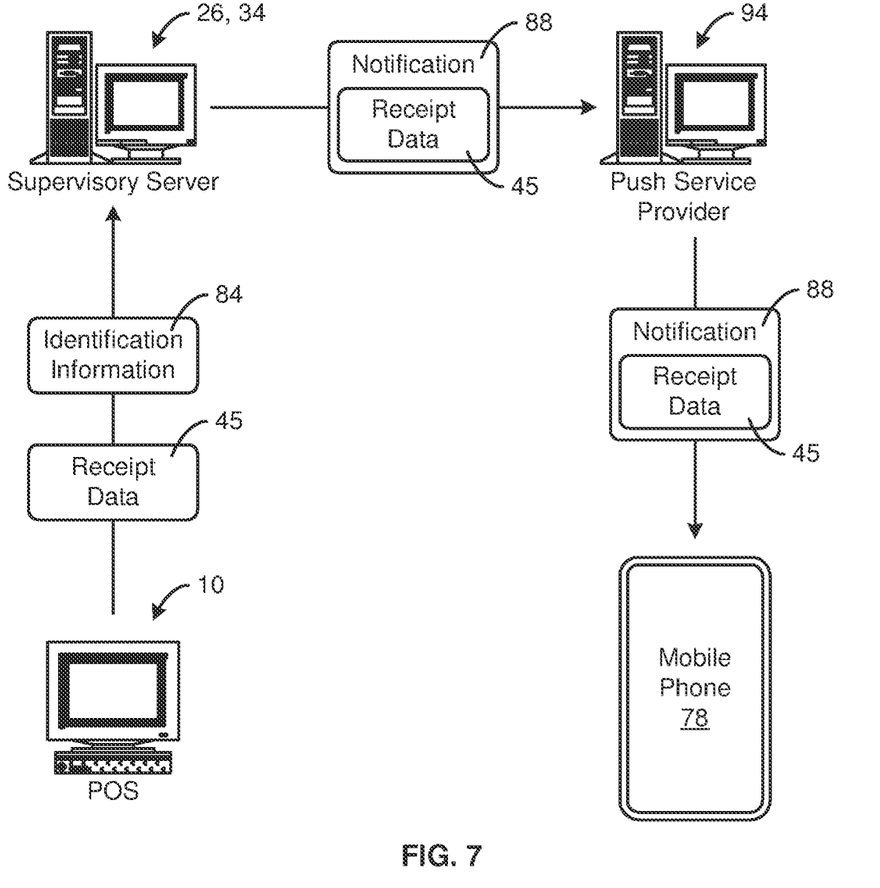
FIG. 7 is a block diagram illustrating the flow of certain data within an alternative embodiment of a system in accordance with the present invention.

Referring to FIG. 7, in selected alternative embodiments, a push notification 88 may carry significantly more data (e.g., payload) than simply an alert message, alert sound, and the like. For example, a push notification 88 may carry certain receipt data 45 to a computing device 78. In certain embodiments, such a push notification 88 may prompt a customer to launch 106 an application in order to receive, store, and display all of the receipt data 45 carried in the push notification 88. Alternatively, the receipt data 45 carried by a push notification 88 may be incorporated with the records or database of an application without regard to whether the application is fully launched.

Figure 8:
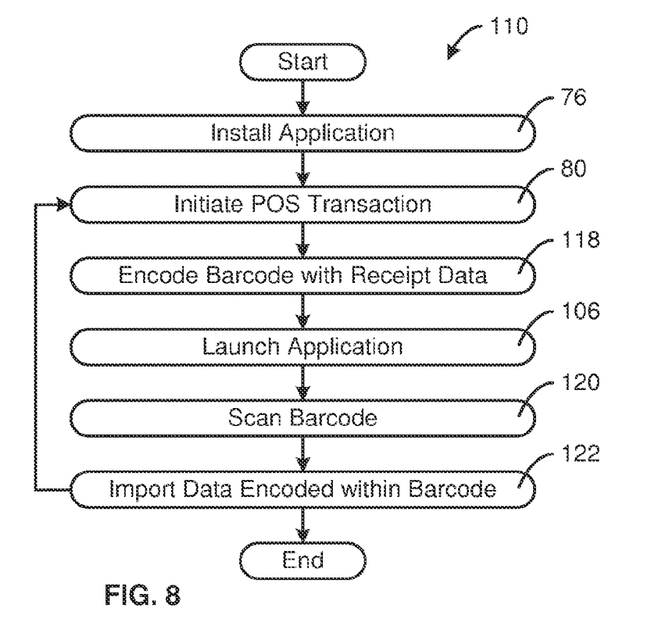
FIG. 8 is a block diagram of an alternative embodiment of a method for passing electronic receipt data from a point-of-sale system to a computing device of a customer.
Figure 9:
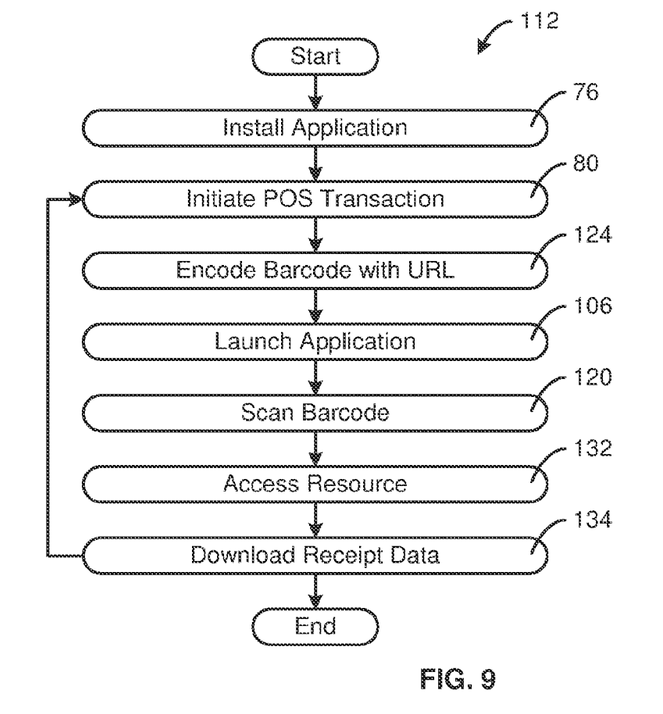
FIG. 9 is a block diagram of another alternative embodiment of a method for passing electronic receipt data from a point-of-sale system to a computing device of a customer.
Figure 10:
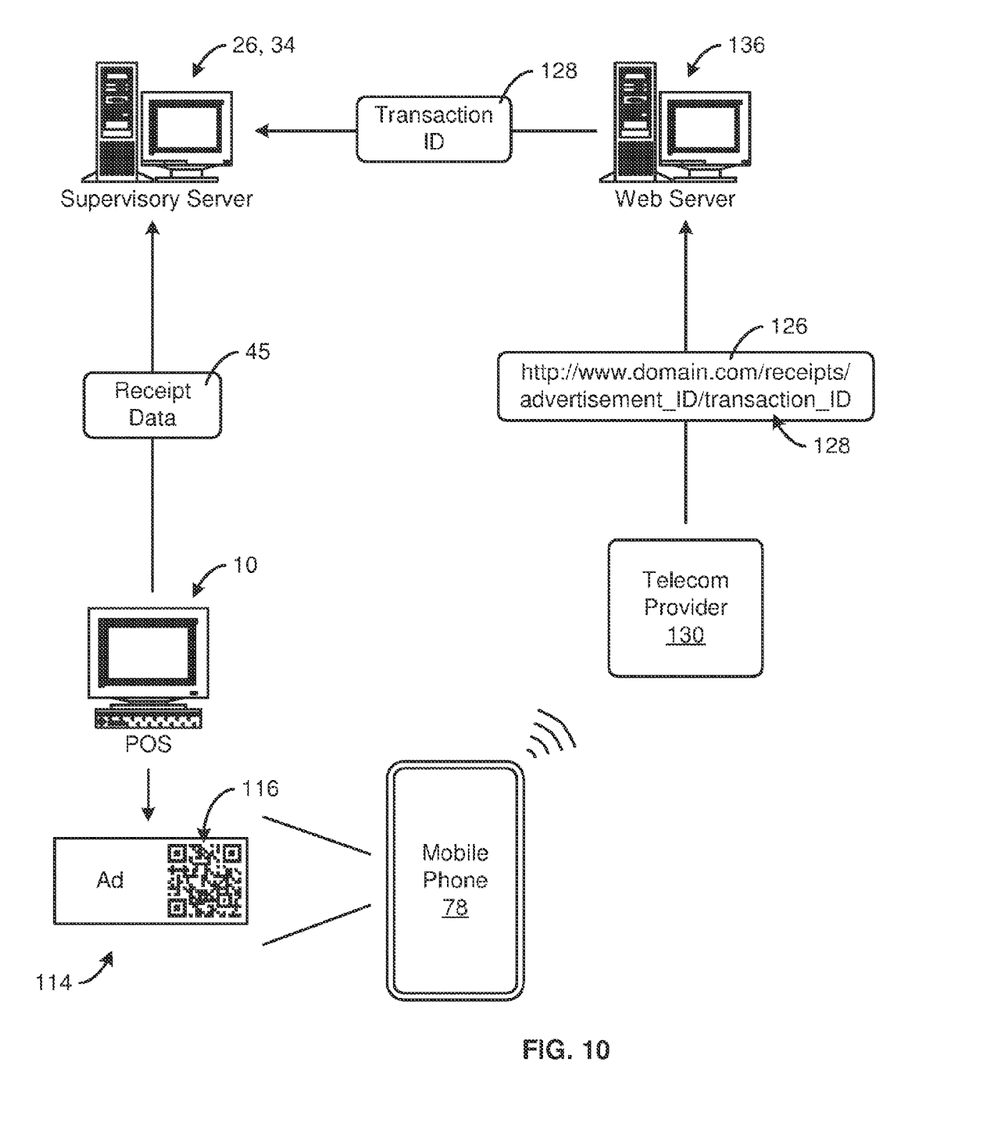
FIG. 10 is a block diagram illustrating the flow of certain data within another alternative embodiment of a system in accordance with the present invention.

Referring to FIG. 8-10, in certain alternative embodiments or methods 110, 112, a computer system may deliver receipt data 45 to a computing device 78 without specifically identifying 82 a corresponding customer. For example, a POS system 10 may present an advertisement 114 containing a machine-readable code 116 to a customer. In selected embodiments, an advertisement 114 may be presented to a customer via a printed paper receipt. Alternatively, or in addition thereto, an advertisement 114 (e.g., the same advertisement 114 or a different advertisement 114) may be presented to a customer via some other output mechanism 20. For example, in selected embodiments, one or more advertisements 114 may be presented to a customer via a customer-facing display 20*a* or screen 20*a*.

A customer-facing display 20*a* may take various forms. In selected embodiments, a customer-facing display 20*a* may be embodied as a stand-alone monitor dedicated to presenting information, advertisements 114, or the like to a customer at a POS. Alternatively, a customer-facing display 20*a* may be a multi-use screen capable of performing various functions. For example, in certain embodiments, a customer-facing display 20*a* may be embodied as a screen on a card reader 18*b*. That is, during or after a transaction, one or more advertisements 114 may be displayed on a screen or a portion of a screen of a card reader 18*b*.

A machine-readable code 116 contained within an advertisement 114 may be encoded 118 with receipt data 45. Accordingly, should a customer respond to a call to action and wish to import receipt data 45, he or she may launch 106 an appropriate application and scan 120 the machine-readable code 116 of an advertisement 114 presented to him or her. For example, a customer may scan an advertisement 114 using the camera of a mobile telephone 78. This may occur at the POS system 10 (e.g., from customer-facing display 20*a*), in which case there may be no need for a paper receipt. Alternatively, it may occur sometime later using an advertisement 114 printed as part of the transaction (e.g., an advertisement 114 printed on a paper receipt or on a piece of paper sized only to accommodate the advertisement 114). By decoding the machine-readable code 116, the application may obtain and import 122 the corresponding receipt data 45.

Alternatively, in selected methods 112, a machine-readable code 116 may be encoded 124 with a URL 126. In addition to designating a particular resource, a URL 126 may also include certain identifications. For example, a URL 126 may include a transaction ID 128. Accordingly, after an appropriate application is launched 106 and a machine-readable code 116 is scanned 120, a URL 126 may be passed from a customer (e.g., from a mobile telephone 78 of a customer) to an Internet Service Provider (e.g., a telecommunications provider 130). As a result, an appropriate resource within a computer system may be accessed 132 and receipt data 45 may be returned to (e.g., downloaded 134 by) a computing device 78.

For example, in selected embodiments, a request may reach a web server 136 corresponding to the URL 126. The request may include the transaction ID 128. Thus, a web server 136 may pass the transaction ID 128 to a local server 26, a supervisory server 34, other resource, or the like. In response, receipt data 45 may be passed back (e.g., through the web server 136, telecommunications provider 130, or the like) to the computing device 78.

The flowchart and block diagrams in FIGS. 5-10 illustrate the architecture, functionality, and operation of possible implementations of systems, methods, and computer program products according to certain embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

It should also be noted that, in some alternative implementations, the functions noted in the blocks may occur out of the order noted in the Figures. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method for transferring receipt data to a computing device corresponding to a customer, the method comprising:
    providing a sales terminal including a code presenting device;
    initiating a transaction with the customer at the sales terminal;
    collecting, by a computer system comprising the sales terminal, the receipt data documenting at least a portion of the transaction;
    generating, by the computer system, a barcode unique to the transaction and comprising encoded data and incorporating a URL within the encoded data, the URL being directed to a resource system from which the receipt data is downloadable by the computing device;
    presenting, by the code presenting device, the barcode to the customer in an advertisement comprising a prompt, wherein the prompt includes at least an invitation to download the receipt data documenting the transaction;
    receiving, by the computer system, a response to the prompt indicating a request for the receipt data documenting the transaction, the response to the prompt comprising scanning the barcode by a scanner of the computing device in possession of the customer;
    generating, by the computer system, a push notification comprising at least the URL in response to the request for the receipt data;
    delivering, by the computer system, the push notification to an application installed on the computing device;
    receiving, from the application on the computing device, an indication that the customer has selected the URL in the push notification; and
    initiating the download of the receipt data to the application on the computing device.

2. The method of claim 1, wherein the code presenting device comprises a printer for printing the advertisement containing the barcode on a paper receipt.

3. The method of claim 1, wherein the code presenting device comprises a customer-facing display for displaying the advertisement containing the barcode.

4. The method of claim 1, wherein the barcode is a two-dimensional barcode.

5. The method of claim 1, wherein the generating the barcode unique to the transaction and comprising the encoded data and incorporating the URL within the encoded data comprises incorporating at least a portion of the receipt data within the encoded data.

6. The method of claim 1, wherein the generating the barcode unique to the transaction and comprising the encoded data and incorporating the URL within the encoded data comprises incorporating the receipt data within the encoded data.

7. The method of claim 1, further comprising receiving the customer within a brick-and-mortar location.

8. The method of claim 1, further comprising completing, by the sales terminal, the transaction.

9. The method of claim 8, wherein the code presenting device comprises a customer-facing display for displaying, after the completing, the advertisement containing the barcode to the customer.

10. The method of claim 8, wherein the code presenting device comprises a printer for printing, after the completing, a paper receipt including the advertisement containing the barcode.

* * * * *